United States Patent [19]

Irvin

[11] Patent Number: 4,630,261

[45] Date of Patent: Dec. 16, 1986

[54] INTEGRATED BUFFER MANAGEMENT AND SIGNALING TECHNIQUE

[75] Inventor: David R. Irvin, Raleigh, N.C.

[73] Assignee: International Business Machines Corp., Armonk, N.Y.

[21] Appl. No.: 635,788

[22] Filed: Jul. 30, 1984

[51] Int. Cl.[4] .......................... H04J 3/17; H04J 3/16; H04Q 3/00

[52] U.S. Cl. ........................................ 370/81; 370/85; 370/89; 370/95; 340/825.5; 340/825.51

[58] Field of Search ....................... 370/81, 85, 89, 80, 370/60, 94, 56, 110.1, 104, 68; 340/825.5, 825.51; 455/58

[56] References Cited

U.S. PATENT DOCUMENTS

| | | | |
|---|---|---|---|
| 4,100,377 | 7/1978 | Flanagan | 370/81 |
| 4,284,850 | 8/1981 | Clingenpeel | 370/81 |
| 4,445,171 | 4/1984 | Neches | 364/200 |

OTHER PUBLICATIONS

A. Even–Chaim, "Some Switching, Signalling and Synchronization Techniques in Satellite Comm. Sys.", Telecomm. Soc. of Australia, vol. 25, No. 3, pp. 239–250, 1975.

Maruta et al, "Design and Performance of a DSI Terminal for Domestic Applications", IEEE Trans. Comm., vol. COM-29, No. 3, Mar. 1981.

Primary Examiner—Douglas W. Olms
Assistant Examiner—Wellington Chin
Attorney, Agent, or Firm—Joscelyn G. Cockburn

[57] ABSTRACT

In a private line multiplexing device a multi-priority buffering system is used to control the transmission of supervisory signaling information and normal messages onto an available communication channel. The system includes a multi-priority message buffer, a queue map for logging entries in the buffer, an output time map and a controller. The controller tags incoming data (be it a normal message and/or signaling information) and stores the data into the priority buffer. The tag may include a priority classification, identification, entry-time, etc. Signaling information is assigned a priority I designation while newly generated voice packets are assigned priority IV. As communication channels become available data is shifted, in accordance with a priority algorithm, from the buffer to the channel. Furthermore, the algorithm ensures that stacked messages from a common source are transmitted on a delayed basis.

10 Claims, 5 Drawing Figures

| PRIORITY | I. D. | ENTRY TIME | RELEASE TIME | LOCATION |
|---|---|---|---|---|
| | | | PRIORITY-3 MESSAGES ONLY | ADDRESS IN MESSAGE BUFFER |

↕ d

QUEUE MAP: d=MAXIMUM DEPTH

| TIMES OF LAST OUTPUT |
|---|
| ID1 |
| ID2 |
| |
| IDN |

◁ OUTPUT-TIME MAP: RECORDS TIME OF CONCLUSION OF LAST MESSAGE READ FROM ID.

| TEXTS |
|---|

MESSAGE BUFFER

INTEGRATED BUFFER MANAGEMENT AND SIGNALING TECHNIQUE

BACKGROUND INFORMATION (1) Field of the Invention

The invention relates to trunk concentrators in general and more particularly to trunk concentrators utilizing the well-known TASI (Time Assignment Speech Interpolation) technique.

(2) Prior Art

The use of a common communication channel for transmitting data generated from a plurality of data terminal equipment (DTE) is well known in the prior art. The data terminal equipment may include devices such as telephones, computers, facsimile-like machines, etc. Except for telephone devices, communication between other types of devices may be done asynchronously. Asynchronous communication suggests that the information being exchanged can be reasonably delayed without adversely affecting the information. Telephone devices usually require synchronous communication. Synchronous communication suggests immediate transmission. Failure to transmit speech within a reasonable time will degredate the contents of the speech. Notwithstanding the differences, telephone and non-telephone devices may be concentrated onto a common communication channel if the concentrator is designed to accommodate the idiosyncrasies associated with speech.

The cyclic pattern or characteristic of speech is the idiosyncrasy that is most utilized in providing a concentrator to handle speech and non-speech intelligence. Generally, the cyclic pattern has a period (burst) of activity followed by a period of silence. By applying an interpolation technique to this cyclic pattern, both speech and non-speech information generated from a plurality of users is made to statistically share a communication channel. Usually, the silent period in the speech is used to transmit an increased number of speech channels and/or non-speech data. The input signal lines (speech and/or data) are monitored for valid signals. When a valid signal is detected, the line is connected with the first free transmission facility. On the receiving end the transmitted information is routed to the appropriate output port for the duration of the speech burst. The technique tends to maximize the efficiency of the communication channel and decrease per user channel cost.

The most widely known and practical implementation of the principle is in the Time Assignment Speech Interpolation (TASI) system which was first introduced by Bell Systems in the early 1960's. Although the system works well for its intended purpose, one common criticism is that the system utilizes large and costly equipment, thus, limiting its application to very special environments such as transoceanic use where transmission facilities are scarce.

The PLC-1 (private line voice concentrator) is another prior art device which uses the principle of speech interpolation to multiplex a large number of users onto fewer communication facilities. In the system blocked speech segments are delayed in a queue, or buffer pending the availability of transmission channel resources. Overload relief is provided by operating the buffer in a FIFO (first-in, first-out) manner, discarding messages which have been in the queue for more than a predetermined period of time. Furthermore, supervisory signaling information is transmitted on a dedicated channel. This channel is not available to the system's users. A more detailed description of the PLC-1 system is given by Nakhla, Michael S., and David Black, "Analysis of a TASI System Employing Speech Storage," IEEE Trans. on Comm., Vol. COM-30, No. 4, April 1982, pp. 780–785; and Black, David, "PLC-1: A TASI System for Small Trunk Groups," also in COM-30, Vol. 4, pp. 786–791.

SUMMARY OF THE INVENTION

It is therefore a general object of the present invention to provide a signal concentrator which is more efficient than has heretofore been possible.

The signal concentrator of the present invention integrates the supervisory signaling function with normal message traffic, thereby freeing any residual signaling capacity for use by the normal message traffic. The technique increases the effective capacity of the communication channel.

The concentrator includes a buffer adapted for storing messages and supervisory signaling information on a priority basis. Signaling information is assigned the highest priority while generated voice packets are classified with a two-tier priority designation. Newly generated voice packets are assigned one of the two-tier priority designations while rescheduled voice packets (to be described) are assigned the other two-tier priority designation.

Two additional priorities are reserved for data: one for low speed voice-band data and one for digital (encoded) data packets. A lookup table or map carries descriptive information about each entry in the buffer. The descriptive information includes priority levels, identification (source of origin), location in the buffer, etc. Another table is used to record the time when messages from a particular speech source exit the buffer. A controller running a priority algorithm utilizes the contents of the tables and sequence entries from the buffer on a priority basis to the communication channel. All the priority I entries are first transmitted (on a FIFO basis) followed by lower priority entries.

In one feature of the invention a delay is inserted between stacked messages from the same originating speech source. The delay ensures that under conditions of heavy system loading some of the naturally occurring inter-message delay associated with speech is maintained.

The foregoing features and other advantages of this invention will be more fully described in the accompanying drawings.

DETAILED DESCRIPTION OF THE PREFERRED EMBODIMENT

Figure 1:
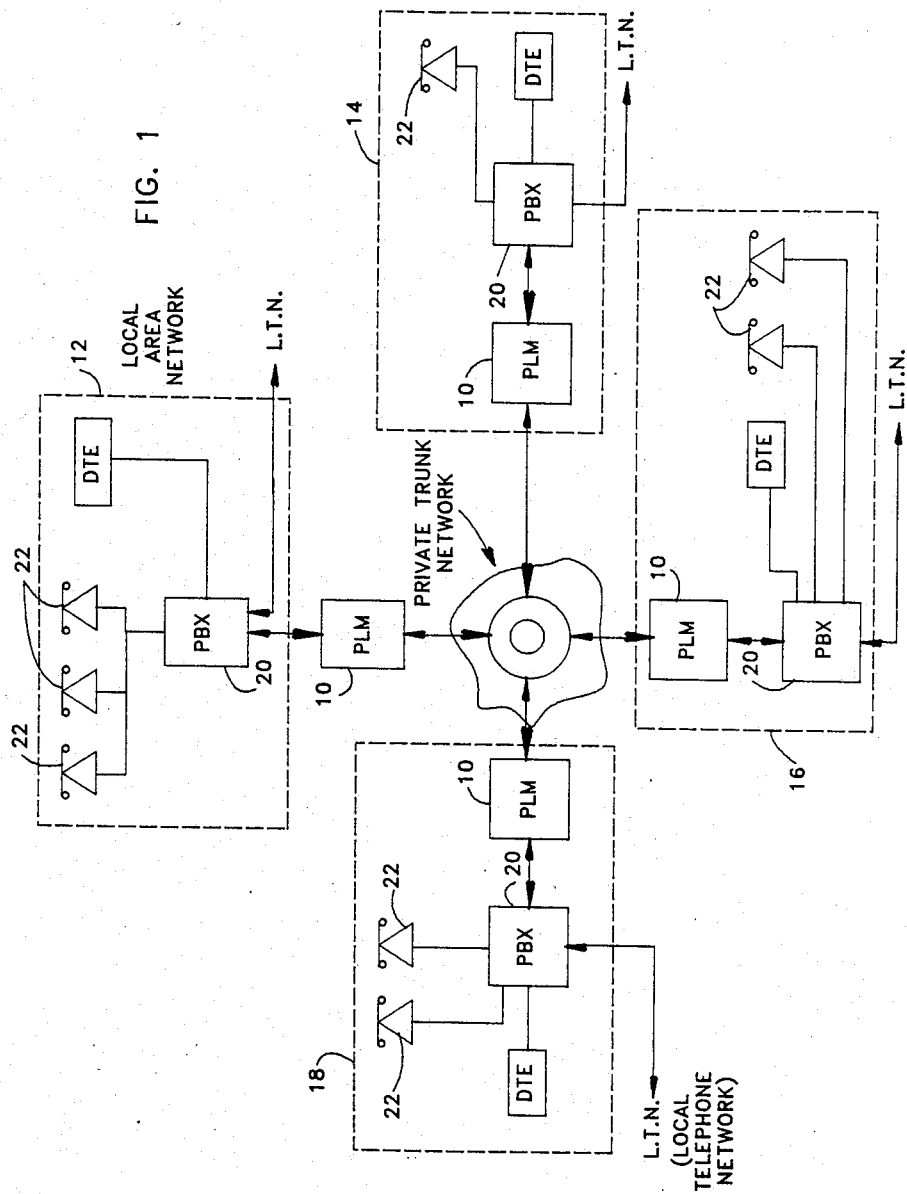
FIG. 1 shows a schematic representation of the Private Line Multiplexer (PLM) according to the teaching of the present invention.

FIG. 1 shows a block diagram of a communication system embodying the teaching of the present invention. The invention is embodied in the boxes identified by numeral 10 and labeled private line multiplexor (PLM). A plurality of the PLM boxes are used to interconnect a plurality of conventional digital PBX's to a private trunk network communication system. The private trunk network provides a digital communication facility which enables a local area network such as the one identified by numeral 12 to be connected to the other local area network identified by numerals 14, 16 and 18. Although the diagram shows four local area networks interconnected with the private trunk communication network, in an actual system as little as two local area networks can be interconnected. Each of the local area networks is located in different and distant localities. For example, local area network 12 may be located in any part of the United States, say Raleigh, N.C., while the other local area network is located in a company headquarters, say in Kingston, N.Y. The interconnection of both local area networks is achieved by the private trunk communication network.

Each of the local area networks includes a private line multiplexer 10 which is connected by a bidirectional bus to a digital PBX identified by numeral 20. The PBX in turn is used to interconnect a plurality of conventional telephones identified by numeral 22. In addition, other devices identified as data terminal equipment (DTE) which may be other telephones, computers, facsimile machines, etc. are also tied into the PBX. The digital PBX is a conventional device which is used for tying such DTEs and as such details of the PBX will not be given. In addition, other local telephone networks (LTN's) are also tied into the PBX's. By way of example, the local telephone network enables personnel in a particular local area network facility to communicate with personnel which are off site, albeit in close proximity with the local area network facility.

Figure 2:
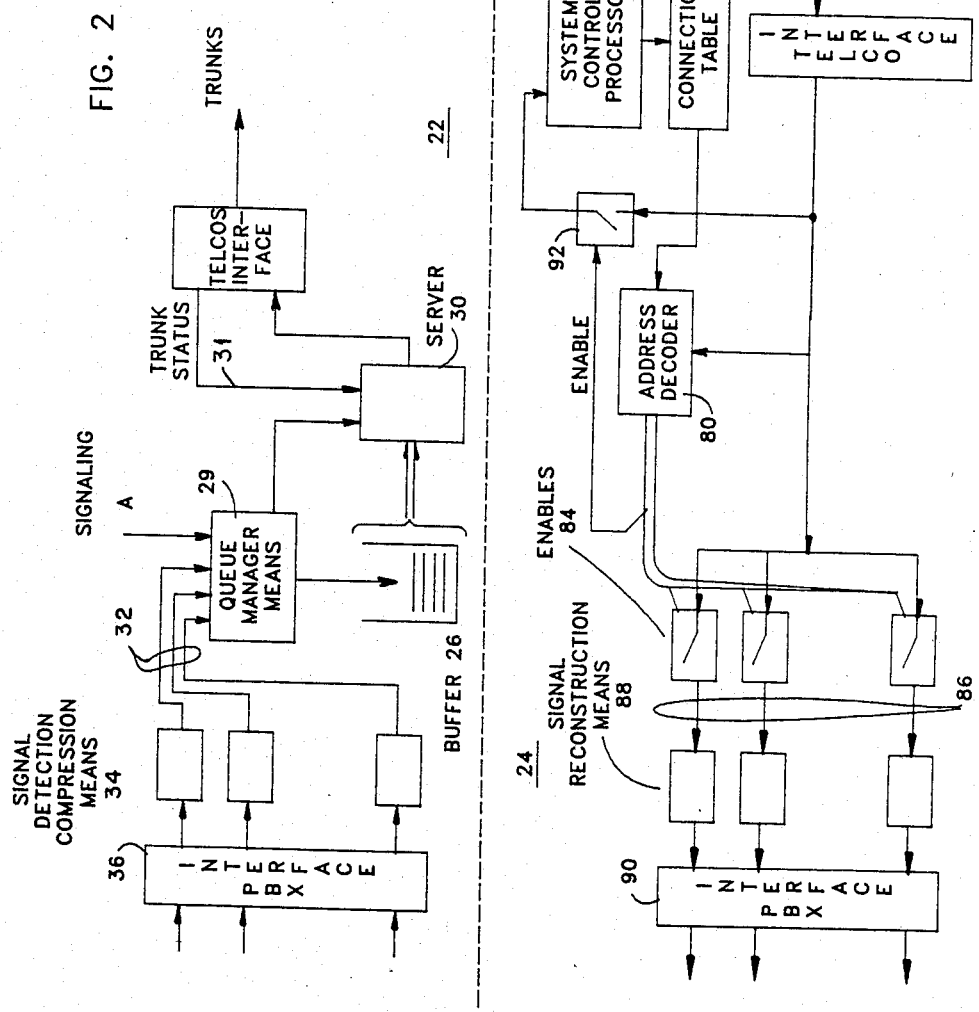
FIG. 2 is a block diagram showing the functional components of the PLM.

FIG. 2 shows a block diagram for the private line multiplexer. The private line multiplexer comprises of a transmitting section 22 and a receiving section 24. The transmitting section 22 is shown above the broken line while the receiving section is shown below the broken line. In the figure and arrows are used to show the direction of data flow in the system. The design and implementation of the PLM revolves around an integrated buffer concept. To this end, a buffer identified by numeral 26 is provided for storing messages generated from different DTE's and signaling information. The signaling information carries control data and is usually generated by the system control processor 28. The signaling information is merged into the normal traffic information which is stored in the buffer and is transmitted onto the trunk on a priority basis (to be described later). The input to buffer 26 is controlled by a queue manager means 29. The output of the buffer is connected and is controlled by server means 30. As will be explained subsequently, the server means 30 sequences entries from buffer 26 in a predetermined priority order (to be described subsequently) over the telco (telephone company) interface into the digital trunks. The status information relative to the trunks are fed over conductor 31 into server means 30. The function of the telco interface is to prime the signals outputted from server 30 so that the signals can be transmitted over trunk lines. The function of the telco interface is well known in the prior art and as such further details will not be given.

As stated previously, the signals into queue manager means 29 are supplied from the DTEs which are attached to the network and the signaling information. The signaling information or control information is generated from the system control processor 28. The other input signals on terminal 32 are outputted from signal detection and compression means 34. The input to the signal detection and compression means 34 is supplied from PBX interface 36, the input to the PBX interface is taken from the internal bus structure of the PBX (not shown). The function of the PBX interface 36 is well known in the art and details will not be given. Suffice it to say that the PBX interface conditions signals outputted from the PBX and feeds those signals into the signal detection and compression means 34. The signal detection and compression means 34 includes a plurality of individual devices which perform signal detection and compression functions. These boxes include standard algorithms which take the digital voice signal from the PBX interface as 12 bit PCM signal and converts down to 16 kilobits per second digitized speech going from 96 kilobits/second PCM to 16 kilobits/second. Devices for performing this function are well known in the prior art and as such details will not be given. A different compression technique, 64 kilobit/second PCM, is used in coding voice-band data signals. Digitized data packets are transmitted directly and are not coded or compressed.

Figures 4, 5:
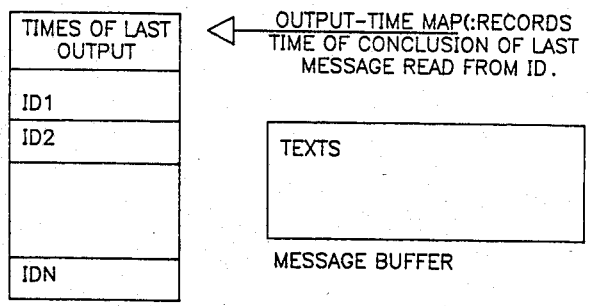
FIG. 4 is a graphical representation of the queue map.
FIG. 5 is a graphical representation of the output time map.

Still referring to FIG. 2, the queue manager means 29 includes a controller and a queue map. Turning to FIG. 4 for the moment, a copy of the queue map is shown. Although the controller can be fabricated from combinatorial logic, in the preferred embodiment of this invention the controller is a microcomputer and the queue map is generated in the RAM associated with the microprocessor. The RAM may be internal or external to the microprocessor. The queue map (FIG. 4) has a maximum depth D and a plurality of vertical columns. The queue map is used to store information about each entry into the message buffer.

In other words, the text associated with a particular message is placed in the buffer while information about each text in the buffer is maintained in the queue map. To this end, the queue map has a priority section, an identification (ID) section, an entry time section, a release time section, and a location section. The priority section is used to store data regarding the priority associated with a particular message. The identification section records an identification number defining the source from which the message is derived. The entry time section is used to record the time when a particular message is stored in the buffer. The release time section is used to record the time when a particular group of messages (to be described later) may be released from the queue. The location section records the address in the message buffer where a particular text is stored. It should be noted that with this map messages can be stored at random addresses in the buffer. As will be explained subsequently, as message packets pour into the queue manager, this information (that is, Priority, I.D., Entry Time, etc.) is extracted and is recorded in the queue map and the text is passed onto the buffer.

Still referring to FIG. 2, the function of server means 30 is to sequence the stored messages in a predetermined priority order from buffer 26 into the trunk or communication channel. Before describing the function and components of server 30, the predetermined priority scheme will be given. All messages entering the queue are assigned to one of five priority classes:

Priority-1: This is the highest priority level and is reserved for supervisory signaling information. This group of signals usually includes signaling between concentrators, etc.

Priority-2: This priority classification is for low-speed voice band data traffic. This level of classification may carry information such as data, etc.

Priority-3: This type of priority is reserved for reschedule voice packets (to be described subsequently).

Priority-4: This priority is used for newly generated voice packets.

Priority-5: This priority is used for digital data packets (enclosed). It represents the PLM's final residual transmission capacity. It is worthwhile noting that the above priority scheme is representative and the priority assigned to each class of traffic may be changed without deviating from the scope and/or spirit of this invention.

Returning to FIG. 2, the server means 30 includes a controller which in the preferred embodiment of this invention is a microprocessor having adequate ROM and RAM storage and an output time map which is formed in the RAM storage and is shown in FIG. 5. The output time map is divided into an ID section and a timing section. The ID section is used to record the identification of the speech source and the time when a particular message from that speech source was last transferred from the queue. As will be explained subsequently, the information in the timing section of the output time map is used to determine the time when a particular message should be transferred from the queue map. As will be explained subsequently, by assigning a departure time to priority 3 messages, the delay which is associated with normal speech is maintained when a plurality of information from a common source is stacked into the buffer. This option is not exercised in transmitting data. In addition, an algorithm is used for running the processor in server means 30 so that the information is outputted from the buffer in accordance with the priority basis.

Figure 3:
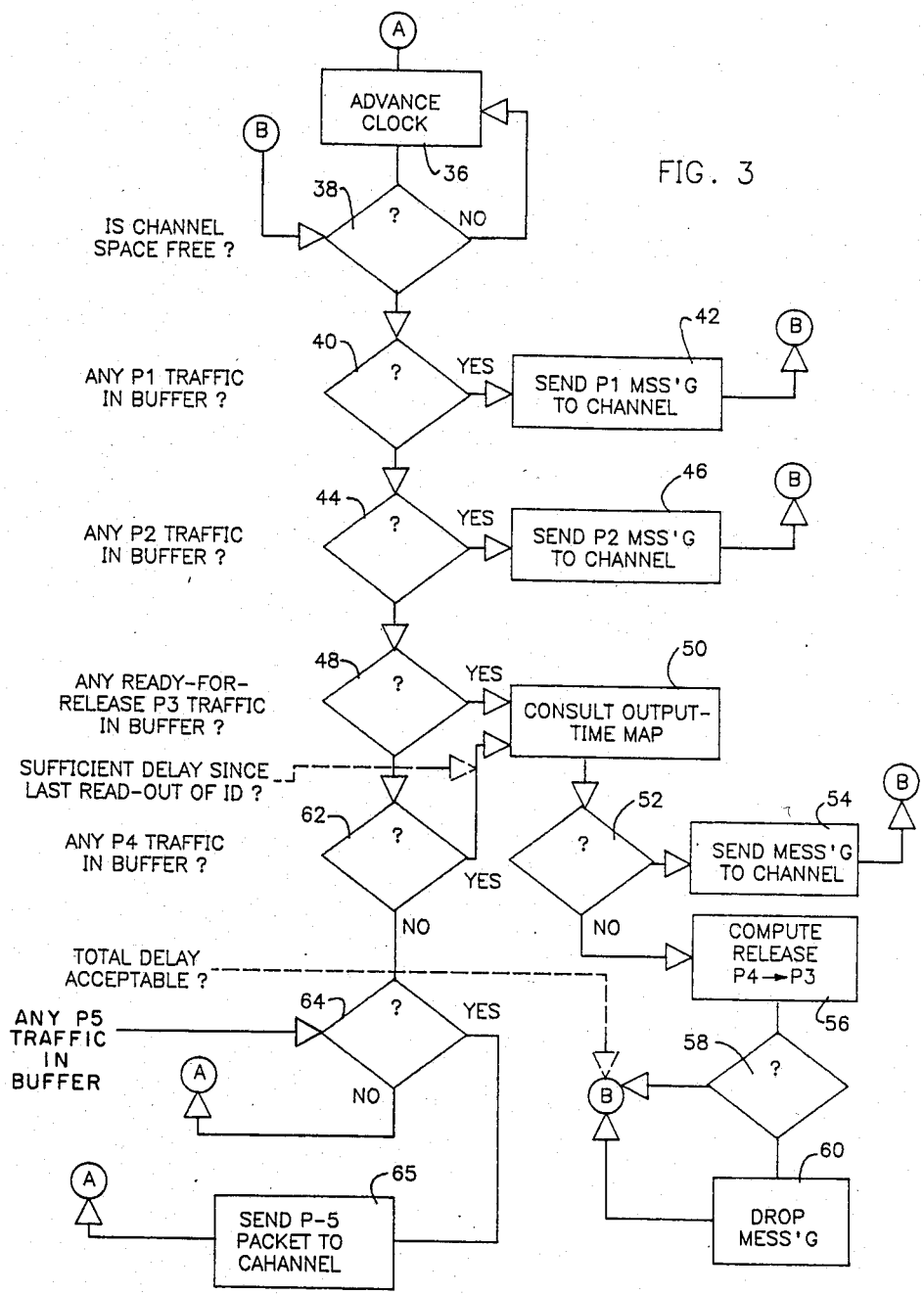
FIG. 3 is a flow chart of the algorithm used to control the sequencing of messages from the message buffer onto the common communication channel.

FIG. 3 shows a flow chart of the algorithm which is used to control the processor in server means 30. The first block identified by numeral 36 is a delay block called advance clock. Block 38 is a decisional block in which the program tests to see if the channel or trunk space is free. This information is supplied over conductor 31 labeled trunk status (FIG. 2). If the trunk is not free, the program enters a loop and after the delay 36 Advance Clock expires the test is again performed. When a free channel is available at the trunk, the program descends into block 40. In block 40 the program scans the queue map and buffer 26 to see if any priority 1 (P1) traffic is in the buffer. If there is any, the program enters block 42 where it sends the P1 message (mess'g) and enters decisional block 38 via a path B.

Still referring to FIG. 3, if there was no P1 traffic in the buffer, the program descends into block 44. In block 44 the program checks to see if there is any priority 2 traffic in the buffer. If there is priority 2 traffic, the program enters block 46 where it sends the P2 message and exits the block via path B. If there was no P2 traffic in the buffer, the program descends into block 48 where it checks to see if any ready for release P3 traffic is in the buffer. If there is any ready for release P3 traffic in the buffer, the program enters block 50. In block 50 the program consults the output time map. The program then descends into decisional block 52. In decisional block 52 the program checks to see if sufficient delay has expired since the last readout of a message from the source which is currently requesting service. If the delay is sufficient, the program enters block 54 where it sends the message to the channel and exits the block along path B. If sufficient time has not lapsed since the last transmission from said source ID, then the program descends into operational block 56. In block 56 the program calculates a release time and changes the priority classification from P4 to P3. As stated before, the P3 classification is reserved for reclassified messages. The program then drops into block 58 where it checks to see if the total delay from the inception of the message to the anticipated time of transmission is acceptable. If it is acceptable, the program exits the block along path B. If not, the program drops into block 60 where the message is dropped and the program exits block 50 along path B.

Still referring to FIG. 3, if in block 48 the answer is in the negative, the program then enters decisional block 62 where it checks the buffer to see if it contains any priority 4 (P4) traffic. If the answer is yes, the program enters block 50 and performs the steps previously described. If there is no P4 traffic in the buffer, the program drops into block 64 where it checks the buffer for the presence of priority 5 (P5) traffic. If P5 traffic is found, a packet is transmitted (block 65), and the program returns along path A. If there is no P5 traffic, the program exits block 64 along path A and repeats the above-described process. A tag identifying the source ID is appended to each departing message on transmission.

Referring again to FIG. 2, the receiver portion of the PLM includes the means for routing each incoming message (from a remote PLM) to its intended destination. Incoming signals from the trunks are primed by the telco interface for entry into the receiver. Message tags are read by the address decoder means 80. For P2, P3, P4, and P5 messages, connection table 82, established via signaling (to be described), authorizes address decoder 80 to operate one of the enable means 84. The incoming message now appears on one of lines 86 for input to the selected signal reconstructor means 88. In cases of P3 or P4 traffic appearing on 86, these reconstructors decode 16 kilobit/second speech originally encoded by the speech compressors means 34. Signals are outputted from the reconstruction as 96 kilobit/second PCM and sent to the attached PBX by the PBX interface means 90. In case of P2 traffic, the reconstructor decodes the associated voice band data as 64 kilobit/second PCM. These signals flow through interface 90 as described. In the case of P5 traffic, the reconstructors do not alter the incoming traffic as no reconstruction is needed. These P5 messages flow through interface 90 to the PBX bus.

In the case of P1 (signaling) messages, the connection table authorizes the address decoder 80 to operate the signaling enable means 92, establishing a path to the system control processor 28.

The connection table 82 contains the routing information associating a particular incoming tag ID with the appropriate PBX input port (connected via PBX interface 90). This path routing is established by a series of signaling (P1) exchanges between the two PBX-PLM pairs at the establishment of each virtual circuit, i.e., during the dialing phase of each phone call or data session. The routing exists only for the duration of a session, and is erased from connection table 82 by a series of signaling exchanges at the termination of a call or session.

Operation

Voice packets are generated by the TASI-like operation of signal activity detectors operating in the input ports. A period of silence is not transmitted as would be expected with any compression system of this type.

The buffer operation is controlled by microprocessor controller and software tables which are maintained up to date as messages flow through the system: a queue map, an output-time map, and the actual message buffer form the crux of the system.

Messages are taken from the buffer as communication channels become available. The readout follows a first-in first-out discipline, within priority groups, with priority-class taking precedence over absolute queue position. In such a system, the priority-1 messages are read (first-in first-out), followed by priority-2 messages (FIFO within their class), etc.

Each message carries a short header indicating its origination ID. The receiver assigns each message to the appropriate destination by reference to a connection table (FIG. 2) established during new traffic signaling. The controller itself is assigned an originator's ID, the appearance of which indicates a signaling message. The originator's ID is the only differentiation between signaling and normal message trafficking (other than the actual message contents). Signaling traffic is assigned priority-1 by the buffer management software.

Regarding voice traffic, the proposed technique creates two priority classes for the management of voice traffic. New voice packets are assigned priority-4 (P4) classification and sent to the buffer. Under conditions of light or normal system loading, these packets will be sequentially read from the buffer without further delay. This mode of operation provides normal voice-communications. A departure time of each message from a channel is logged (overwriting the previous entry for a given origination ID) in the output time map (FIG. 5). Prior to the message's departure and logging, a check is made (by reference to the output-time map) to see if sufficient time has lapsed since the message from the same originating ID last departed the queue. The purpose of this check is to ensure that, under conditions of heavy systems loading, some of the naturally occurring inter-message delay remains, as "stacked" messages from a given ID are read from the queue. If needed, a short delay is inserted before the message is allowed to exit the buffer. Such messages are assigned a "release time" and their priority is changed from class-4 to class-3. These messages then remain in the buffer pending the arrival of the release time. A delay will not be included when the messages under consideration are initially generated without significant interspersed gaps. Voice traffic is dropped from the buffer if it lingers past a predetermined allowable maximum total delay.

The present invention provides several advantages which are not present in the prior art, for example, the invention increases channel efficiency for small user groups.

The present invention preserves a component of the naturally occurring interspersed silences between active speech segments.

The present invention maintains voice band data integrity by inclusion of a separate priority class in the buffer.

The present invention allows the integration of digital data packets with voice band data and speech.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. In a time assignment speech interpolation communication system a method for concentrating a plurality of users channels onto a common communication channel comprising the steps of:
    (a) providing a common buffer for buffering the information generated from each of the user's channels;
    (b) classifying the buffered information with at least a two-tiered priority scheme with one of said tiered priority scheme being designated for identifying supervisory signaling data and another one of said tiered-priority scheme being designated for identifying non-supervisory signaling data; and
    (c) transferring the buffered information to the common communication channel with supervisory signaling data having a high priority and being a first class of data to be transmitted on the common communication channel followed by low priority non-signaling data whereby the entire channel capacity is available for transmitting low priority non-signaling data in the absence of supervisory signaling data from said common buffer.

2. The method recited in claim 1 further including the steps of selectively inserting a delay between consecutive transmission of messages originating from a common source.

3. The method of claim 2 wherein the low priority non-signaling data is being tagged with a priority-2 designation for voice-band data traffic, a priority-3 designation for rescheduled voice packets, a priority-4 designation for newly generated voice packets, and a priority-5 designation for digital data packets.

4. A method for concentrating a plurality of signaling and non-signaling (e.g., voice, data, control, etc.) messages over a common communication channel in a TASI communicating system comprising the steps of:
    (a) prioritizing the signaling and non-signaling messages in accordance with a predetermined priority scheme;
    (b) randomly storing the messages in a storage means;
    (c) providing a lookup table having descriptive information relative to each entry in the storage means with the descriptive information being operable to at least identify the location whereat a message is being stored in the storage means and the priority of the message;
    (d) sequencing messages onto the common communication channel based upon its priority classification in the lookup table whereby messages having the highest priority are being transferred first followed by messages of lower priority.

5. An apparatus for use in a TASI type communication system to concentrate a plurality of signaling and non-signaling (e.g., data, voice, etc.) messages over a common communication channel comprising:
    means operable for buffering the messages;

means operable for monitoring the messages and to assign a priority based upon the class of the message;

means being accessible by the monitoring means and operable for recording descriptive statements for messages stored in the buffering means; and means operable to correlate messages with their associated priorities and to enable messages to flow from the buffer into the communication channel in accordance with the priority designation whereby messages having the highest priority are delivered first to the communication channel followed by messages having lower priorities.

6. The apparatus of claim 5 wherein the means for recording descriptive statements includes a queue map having a section for recording priority, a section for recording message identification, a section for recording time and a section for recording location whereat a message is stored in the buffer.

7. The apparatus of claim 5 wherein the means for controlling the flow of messages from the buffer onto the common communication channel includes a microprocessor and a priority algorithm for controlling said microprocessor.

8. An improved shared communication system for concentrating a plurality of users channels onto a common communication channel comprising:

means operating on the user's channel for providing voice packets;

means operable for generating signaling packets;

a common message buffer operable for storing voice packets and signaling packets;

a queue map adapted for storing descriptive statements relative to each entry in the message buffer;

a means adaptable for monitoring the voice messages and the signaling messages and to assign a priority classification to each message and to record said priority classification in said queue map; and means adaptable for correlating each packet in the buffer with its designated priority classification being recorded in the queue map whereby the highest priority packets are removed from the message buffer followed by the low priority packets onto the common communication channel.

9. The shared communication system of claim 8 further including means for recording entries stating the time when messages from each source was last transmitted from the queue; and means including the correlating means, operable for recording the time entries, and to utilize said time entry to insert a delay thereby ensuring that sufficient time has lapsed since a message from the same source last departed the queue.

10. The method of claim 3 wherein data in the priority classes is being transferred in an ascending order.

* * * * *